Patented Oct. 15, 1946

2,409,274

UNITED STATES PATENT OFFICE 2,409,274

POLYFLUORO ORGANIC ETHERS AND THEIR PREPARATION

William E. Hanford, Easton, Pa., and George W. Rigby, Wilmington, Del., assignors to E. I. du Pont de Nemours & Company, Wilmington, Del., a corporation of Delaware No Drawing. Application April 23, 1943, Serial No. 484,301

16 Claims. (Cl. 260—614)

This invention relates to the preparation of fluorinated organic compounds and to new organic fluorine compounds. More particularly, the invention comprises a new process for the preparation of polyfluoro organic ethers and includes new chemical products consisting of polyfluoroethyl organic ethers containing at least three fluorine atoms attached to the ethyl group of which at least one fluorine atom is attached to the alpha carbon atom.

It has previously been proposed to produce organic fluorine compounds by the reaction of fluorine with various organic materials. Prior investigations have shown that this reaction of fluorine results in vigorous or explosive reactions, accompanied by charring and decomposition of the organic reactant. Accordingly, the direct action of fluorine on organic materials has not been useful as a means for preparing organic fluorides.

The usual method for preparing organic fluorine compounds has been to react halogenated compounds with metallic fluorides or with hydrogen fluoride. However, such processes are expensive, yield mixtures of products, and their application is restricted to certain types of halogenated compounds. Heretofore, there has not been prepared any fluorinated ethyl organic ethers containing at least three fluorine atoms attached to the ethyl group, of which at least one fluorine atom is attached to the alpha carbon atom.

It is an object of this invention to provide a new process for the preparation of polyfluoro organic ether compounds. Another object of this invention is to obtain new compositions of matter consisting of polyfluoroethyl organic ethers containing at least three fluorine atoms attached to the ethyl group, of which at least one fluorine atom is attached to the alpha carbon atom. Still another object is to prepare polyfluoroethyl ethers which are relatively stable and are generally applicable for use as solvents and reaction media. Another object is to prepare polyfluoroethyl ethers without using dangerous or expensive inorganic reagents. A further object is to provide a process for readily preparing polyfluoroethyl ethers in high yield without undesirable side reactions. A still further object is to obtain trifluoroethyl organic ethers and tetrafluoroethyl organic ethers which possess many novel and useful properties. Other objects will appear hereinafter.

These objects are accomplished by reacting in the presence of a basic catalyst, a polyfluoroethylene containing at least three halogen atoms, two of which are fluorine, attached to a single carbon atom, with an organic compound containing at least one hydroxyl group. This reaction produces polyfluoroethyl ethers. New reaction products are obtained by reacting in the presence of a basic catalyst, a polyfluoroethylene containing at least three fluorine atoms with an organic compound containing at least one hydroxyl group. These new reaction products are polyfluoroethyl ethers containing at least three fluorine atoms attached to the ethyl group, of which at least one fluorine atom is attached to the alpha carbon atom. The prefix "poly" as used herein refers to the number of fluorine atoms in the molecule and not to polymeric materials.

A preferred form of the invention may be carried out by reacting tetrafluoroethylene or trifluorochloroethylene with an alcohol in the presence of a basic catalyst. Polyfluorinated ethyl organic ethers are obtained which are usually liquids and are easily separated from the reactants by fractional distillation or by washing with water in case the alcohol is soluble in water. These resulting products may be represented by the general formula $HCX_2CX_2$—$OR$, where one X is selected from the group consisting of hydrogen and halogen, the other three X's are fluorine and where R is the organic radical of an alcohol. As used herein the term "alcohol" designates an organic compound containing at least one hydroxyl group (—OH) and includes short and long chain, cyclic, acyclic, heterocylic, aromatic, polyhydric and polymeric alcohols which may or may not contain other substituents. Alcohols containing functional groups other than the hydroxyl groups are operable because the rate of reaction of the hydroxyl is very fast compared with the rate of reaction of the other reactive groups. Little or no by-products are obtained, especially when an excess of alcohol over the polyfluoroethylene is used. Alcohols containing no other functional groups are however preferred.

The polyfluoroethylenes suitable for use in this invention may be represented by the general formula $CF_2=CX_2$, where one X is selected from the group consisting of hydrogen and halogen and the other X is halogen. Polyfluoroethylenes containing at least three fluorine atoms are preferred and produce new reaction products. The preferred polyfluoroethylenes may be represented by the general formula $CX_2=CX_2$, where one X is selected from the group consisting of hydrogen and halogen and the other three X's are fluorine. More specifically, this formula may be written $CFX=CF_2$, where X is selected from the group consisting of hydrogen and halogen. When the polyfluoroethylene is asymmetrical, the reaction with alcohols leads to isomeric products. These isomeric products may be represented by the general formula $HCXFCF_2$—$OR$ and $HCF_2CFX$—$OR$.

In the case of tetrafluoroethylene, which is symmetrical, only one product is possible

where —OR represents the monovalent residue of a hydroxyl-containing organic compound wherein hydrogen has been removed from the hydroxyl group.

Hydroxyl-containing organic compounds suitable for use in this invention may be saturated or unsaturated, cyclic or acyclic, heterocyclic, aliphatic or aromatic, monomeric or polymeric compounds. These organic compounds, broadly termed alcohols herein, may be represented by the general formula ROH where R represents the monovalent organic radical of an alcohol. Aliphatic, including cycloaliphatic, alcohols are particularly preferred for use in this invention.

In this invention, it is necessary to use a basic catalyst in the reaction. It is generally desirable to use a basic catalyst which is soluble in the reaction mixture or reacts to give a compound which is soluble in the reaction mixture. The basic catalysts which may be used include the alkali metals—sodium, lithium and potassium, the alkali metal alkoxides, which may or may not correspond to the alcohol being reacted, sodium methylate, sodium ethylate, sodium phenolates, sodium hydroxide, potassium hydroxide and salts of alkali metals such as sodium and potassium carbonates, acetates and cyanides. However, the alkali metal alkoxides are preferred as catalysts.

The proportion of catalyst may vary within relatively wide limits depending largely upon the nature of the reactants and products desired. Generally, desirable results may be obtained with the use of amounts of catalyst corresponding to about .001 to 10.0% by weight of the materials used. Advantageous results are sometimes obtained by using a combination of catalysts.

The method of carrying out the reactions varies to some extent with different types of alcohols but the usual procedure comprises charging a given amount of polyfluoroethylene containing at least three halogen atoms, two of which are fluorine attached to a single carbon atom, such as tetrafluoroethylene, and an alcohol with a small amount of a basic catalyst into a high pressure reaction vessel, and then closing and heating to the desired temperature while mechanically agitating the reaction vessel for several hours. Since the polyfluoroethylenes which are operable in this invention are low boiling, it is usually desirable to carry out the reaction in a closed system.

The temperature at which the reaction is effected may be varied over a wide range, depending largely upon the nature of the reactants, the catalyst, the results desired and other conditions of the reaction. Although it is usually desirable to carry out the reactions above room temperature, satisfactory reaction is sometimes obtained at 0° C. or at even lower temperatures. The preferred temperature range is 25 to 175° C., but higher temperatures below the decomposition or pyrolysis temperature of either the reactants or products are sometimes desirable.

The invention is further illustrated by the following examples in which the parts are by weight unless otherwise specified:

Example I

A stainless steel reactor was charged with 70 parts of absolute ethanol and 0.5 part of metallic sodium. The reactor was flushed with oxygen-free nitrogen, evacuated and charged with 75 parts of tetrafluoroethylene. The mixture was heated at 50° C. with mechanical agitation for 8 hours. At the end of this time, the pressure was released through a dry ice trap in which 2 parts of liquid collected. The product from the reactor was combined with the contents of the dry ice trap, and the material was rectified through an efficient column. The fraction boiling at 54° C. amounted to 101.7 parts, and appeared to contain a small amount of ethanol. After washing the crude ether with distilled water and drying, the 1,1,2,2-tetrafluoroethyl ethyl ether was found to boil constantly at 57.5° C. at atmospheric pressure and had the following physical properties: $n_D^{25}$, 1.294; $d_4^{25}$, 1.1978. Found: F, 51.97%; calc. for $HCF_2CF_2OC_2H_5$: F, 52.0%.

Example II

An autoclave was charged with 93 parts of dodecyl alcohol and 0.5 part of metallic sodium cut into small pieces. The autoclave was blanketed with ntrogen, evacuated and charged with 50 parts of tetrafluoroethylene. The mixture was heated with shaking for 8 hours at 75° C. The product was removed and rectified through an efficient packed column. The 1,1,2,2-tetrafluoroethyl dodecyl ether boiled constantly at 105° C./4 mm. and amounted to 142.1 parts and had the following physical properties: $n_D^{25}$, 1.3968; $d_4^{25}$, 0.9831; Found: F, 25.52%; calc. for $C_{14}H_{26}F_4O$: F, 26.5%.

Example III

Twenty-five parts of a hydrolyzed ethylene/vinyl acetate copolymer (mol ratio 1:1) was charged into a stainless steel reactor together with 100 parts of freshly distilled dioxane and 10 parts of 30% sodium methylate. The reactor was charged with 50 parts of tetrafluoroethylene and the mixture heated to 145° C. for 8 hours with shaking. At the end of this time, there was practically no pressure on the autoclave and the reaction mixture consisted of a viscous liquid which was poured into distilled water with stirring to precipitate the product. The product was a sticky white material which, after washing thoroughly with water and drying, was found to contain 18.3% fluorine. The poymeric tetrafluoroethyl ether was soluble in dioxane at room temperature and completely insoluble in hot water.

Example IV

A mixture of 62 parts of ethylene glycol, 35 parts of anhydrous diethyl ether and 0.5 part of metallic sodium was charged into an autoclave, and 50 parts of purified tetrafluoroethylene was added. The mixture was heated at 75° C. with agitation for 8 hours. The reaction mixture was rectified through an efficient column to obtain 10 parts of a fraction boiling at 37–80° C./100 mm. which appeared to contain some of the di-ether. The main product, boiling from 86–95° C./100 mm., amounted to 49.7 parts. There was recovered 43.2 parts of ethylene glycol boiling at 140° C./100 mm. The main product was redistilled, yielding two fractions:

1st fraction (23.7 parts) boiling at 86° C./100 mm.; $n_D^{25}$, 1.3202; $d_4^{25}$, 1.4726; F, 53.50%.
2d fraction boiling at 94° C./100 mm.; $n_D^{25}$, 1.3418; $d_4^{25}$, 1.4159; F, 46.31%.
Calculated for 1,2-bis(1,1,2,2-tetrafluoroethoxy)-ethane, $C_6H_6F_8O_2$, F=58%.
Calculated for 1,1,2,2-tetrafluoroethyl beta-hydroxyethyl ether glycol ether, $C_4H_6F_4O_2$, F= 46.9%.

Example V

A mixture of 50 parts of anhydrous phenol, 1 part of metallic sodium and 40 parts of benzene was charged into a stainless steel autoclave. After the sodium has completely reacted, the autoclave was flushed with nitrogen, evacuated and 50 parts of tetrafluoroethylene was added. The mixture was heated with shaking at 100° C. for 12 hours. Rectification of the reaction mixture yielded 4.9 parts of the 1,1,2,2-tetrafluoroethyl phenyl ether boiling at 102° C./100 mm.

Example VI

Ten parts of cellulose was steeped in 100 parts of 1% sodium hydroxide for 30 minutes and was then centrifuged to 20 parts. This cellulose was charged into a silver-lined autoclave, and after blanketing with nitrogen, the autoclave was evacuated and 50 parts of tetrafluoroethylene was added. The mixture was heated at 75° C. with agitation for 12 hours. The product was suspended in water and washed with water until the washings were no longer alkaline. After drying to constant weight the tetrafluoroethyl ether of cellulose was found to contain 5.38% F. The product was not wet by water and had improved fire resistance.

Example VII

A mixture of 18 parts of 1,1-difluoro-1-chlorethylene was reacted with 20 parts of absolute ethanol containing 0.2 part of sodium in a stainless steel autoclave at 75° C. for 12 hours. The reaction mixture was washed with water to remove the alkali and excess alcohol, dried and rectified. The difluorochloroethyl ethyl ether boiled at 86–93° C. and mainly at 91–93° C. The structure of the product was proven to be

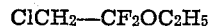

by heating with silica gel to obtain

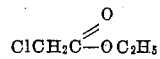

Example VIII

A silver-lined autoclave was charged with 46 parts of absolute ethanol in which 0.5 part of sodium had been dissolved, and after cooling and evacuating, 60 parts of trifluorochloroethylene was distilled in. The mixture was shaken for 8 hours at 75° C. At the end of this time no unreacted trifluorochloroethylene was recovered from the autoclave. When rectified through a packed column, all the reaction mixture boiled at 72–73° C. The alcohol was removed from this constant-boiling mixture by washing with water. The pure trifluorochloroethyl ethyl ether was found to boil at 87–88.2° C.; $n_D^{20}$, 1.3451; $d_4^{20}$, 1.2729. Found: Cl, 21.03%; F, 34.72%. Various chemical reactions have indicated the structure of the product to be $HCFClCF_2OC_2H_5$. (Calc: Cl, 21.85%; F, 35.1%.)

Example IX

A silver-lined high pressure reaction vessel was charged with 80 parts of absolute ethanol, 1 part of potassium cyanide and 25 parts of tetrafluoroethylene. The reaction mixture was heated at 50° C. with agitation for 4 hours and the 1,1,2,2-tetrafluoroethyl ethyl ether isolated and purified as described in Example I.

Example X

A mixture of 100 parts of cyclohexanol, 0.5 part of metallic sodium cut into small pieces and 50 parts of tetrafluoroethylene was reacted at 50° C. for 8 hours. No pressure remained in the autoclave at the end of this time. Rectification of the reaction mixture yielded 107.2 parts of 1,1,2,2-tetrafluoroethyl cyclohexyl ether boiling at 86° C./100 mm.; $n_D^{25}$, 1.3848; $d_4^{25}$, 1.1526; F, 37.3%. Calc. for $HCF_2CF_2OC_6H_{11}$: F, 38.0%.

Among the polyfluoroethylenes containing at least three halogen atoms, two of which are fluorine attached to a single carbon atom, which are applicable in this invention are tetrafluoroethylene, trifluoroethylene, trifluorobromoethylene, trifluorochloroethylene and 1,1-difluoro-2-chloroethylene. The polyfluoroethylenes containing at least three fluorine atoms are preferable as they react readily with alcohols in the presence of a basic catalyst to yield new polyfluoroethyl ethers. The process is particularly applicable to tetrafluoroethylene which reacts the most readily and is most preferred.

The preferred hydroxyl-containing organic compounds for use in this invention are aliphatic, including cycloaliphatic, alcohols. However, this invention is applicable to hydroxyl-containing organic compounds in general. These include the aliphatic, including cycloaliphatic, alcohols, aromatic alcohols and phenols and alcohols containing other functional groups. Examples of aliphatic, including cycloaliphatic alcohols are the lower aliphatic alcohols, such as methanol, ethanol, propanol, isopropanol, n-butanol, isobutanol, terbutanol and the straight and branched chained pentanols; higher alcohols, e. g. those containing six or more carbon atoms, such as, cyclohexanol, hexanol, octanol, dodecanol and octadecanol; polyhydric alcohols, such as, ethylene glycol, glycerol, propylene glycol, 1,3-butylene glycol, hexamethylene glycol, decamethylene and 1,12-octadecanediol; polymeric alcohols, such as polyvinyl alcohol and hydrolyzed polyvinyl acetal copolymers. Examples of aromatic alcohols and phenols include benzyl alcohol, phenol, the cresols, resorcinol, hydroquinone; thymol and menthol. Examples of alcohols containing other functional groups include the halohydrins, such as ethylene chlorohydrin, ethylene bromohydrin and glycerol chlorohydrin, hydroxyacetic acid and its esters, the monomethyl-, monoethyl-, and monobutyl ethers of ethylene glycol, diethylene glycol and higher polyethylene glycols; unsaturated alcohols, such as allyl alcohol, methallyl alcohol, anad crotyl alcohol; partially hydrolyzed polyvinyl acetate, cellulose, and cellulose derivatives which may contain ether and ester linkages, starch and partially methylated starch, mono- and polysaccharides and their derivatives which contain ether and ester linkages.

Although a mixture of alcohols may be employed in the present invention, it is preferable to use a single alcohol and to use a molecular excess of this reactant as compared to the more expensive polyfluoroethylene. Advantageous results are sometimes obtained by using solvents such as benzene, diethyl ether, water, isooctane and dioxane.

It will be understood that the operating conditions may vary widely depending upon the nature of the compounds which are being reacted and also upon the results desired. The time required for carrying out the reaction may vary from a few minutes to several days, depending upon the nature of the reactants and the other operating conditions such as temperature, pressure, and catalyst.

The process may be operated continuously or intermittently. The reaction may be carried out in a closed system or the reaction may be carried out in the vapor phase by mixing the vapors of the alcohol and polyfluoroethylene and passing the mixture through a hot reaction tube which contains the catalyst. The reaction may be carried out under subatmospheric, atmospheric or superatmospheric pressure in the range .1 to 1,000 atmospheres. The preferred pressure range is 1 to 200 atmospheres.

The reactions may be carried out in any suitable reaction vessel, such as stainless steel, iron, enamel, silver, aluminum, Monel metal, copper and other metals and alloys which are capable of withstanding heat and pressure. The reaction is preferably carried out with agitation, but agitation is not always necessary. The reaction and the separation or isolation of the products may be carried out simultaneously or in separate steps. The products may be separated by filtration, extraction or distillation depending upon the nature of the products.

This invention is useful for the production of a wide variety of organic polyfluoroethyl ethers and particularly polyfluoroethyl alkyl ethers. These products are useful for various commercial purposes. Since all the products of this invention are relatively stable, they are generally useful as solvents and reaction media. Many of the products have been found to be very desirable in that they are substantially nonflammable, noncorrosive and nontoxic.

This invention is particularly advantageous in that it affords a safe, flexible, practical and economical method of producing highly fluorinated ethyl ethers. One of the advantages of the invention is that the process may be operated with a relatively small amount of catalyst and the reaction proceeds smoothly and easily without undesirable side reactions.

As many apparently widely different embodiments of this invention may be made without departing from the spirit and scope thereof, it is to be understood that we do not limit ourselves to the specific embodiments thereof except as defined by the appended claims.

We claim:

1. A process for the production of polyfluoroethyl ethers which comprises reacting, in the presence of a member selected from the class consisting of alkali metal alkoxides, alkali metal hydroxides, alkali metals and alkali metal salts, a polyfluoroethylene containing at least three halogen atoms, two of which are fluorine attached to a single carbon atom, and an oxy organic compound wherein each oxygen singly bonded to a carbon is further bonded to hydrogen.

2. A process for the production of polyfluoroethyl ethers which comprises reacting, in the presence of a member selected from the class consisting of alkali metal alkoxides, alkali metal hydroxides, alkali metals and alkali metal salts, a polyfluoroethylene containing at least three fluorine atoms and an oxy organic compound wherein each oxygen singly bonded to a carbon is further bonded to hydrogen.

3. A process for the production of polyfluoroethyl ethers which comprises reacting, under pressure at a temperature between 25–175° C. in the presence of a member selected from the class consisting of alkali metal alkoxides, alkali metal hydroxides, alkali metals and alkali metal salts, a polyfluoroethylene containing at least three halogen atoms, two of which are fluorine attached to a single carbon atom, and an oxy organic compound wherein each oxygen singly bonded to a carbon is further bonded to hydrogen.

4. A process for the production of polyfluoroethyl ethers which comprises reacting, under pressure at a temperature between 25–175° C. in the presence of a basic alkali metal salt, a polyfluoroethylene containing at least three halogen atoms, two of which are fluorine attached to a single carbon atom, and an oxy organic compound wherein each oxygen singly bonded to a carbon is further bonded to hydrogen.

5. A process for the production of polyfluoroethyl ethers which comprises reacting, under pressure at a temperature between 25–175° C. in the presence of an alkali metal alkoxide, a polyfluoroethylene containing at least three halogen atoms, two of which are fluorine attached to a single carbon atom, and an oxy organic compound wherein each oxygen singly bonded to a carbon is further bonded to hydrogen.

6. A process for the production of polyfluoroethyl ethers which comprises reacting, under pressure at a temperature between 25–175° C. in the presence of an alkali metal alkoxide, a polyfluoroethylene containing at least three fluorine atoms and an aliphatic alcohol.

7. A process for the production of tetrafluoroethyl ethers which comprises reacting, in the presence of an alkali metal alkoxide, tetrafluoroethylene and an oxy organic compound wherein each oxygen singly bonded to a carbon is further bonded to hydrogen.

8. The process for obtaining a tetrafluoroethyl ether which comprises reacting tetrafluoroethylene with an alcohol selected from the group consisting of aliphatic and cycloaliphatic alcohols under pressure at a temperature within the range of from 25° C. to 175° C. in the presence of an alkali metal alkoxide.

9. The process for obtaining a tetrafluoroethyl ether which comprises reacting tetrafluoroethylene with ethanol under pressure at a temperature within the range of from 25° C. to 175° C. in the presence of sodium ethylate.

10. A tetrafluoroethyl ether having the general formula $HCF_2CF_2OR$, wherein R represents the organic radical of an oxy organic compound wherein each oxygen singly bonded to a carbon is further bonded to hydrogen.

11. A tetrafluoroethyl ether having the general formula $HCF_2CF_2OR$, wherein R represents the organic radical of an alcohol.

12. A tetrafluoroethyl ether having the general formula $HCF_2CF_2OR$, wherein R is the non-hydroxyl portion of an alcohol selected from the group consisting of aliphatic and cycloaliphatic alcohols.

13. A tetrafluoroethyl ether having the formula $HCF_2CF_2OHC_2CH_3$.

14. A polyfluoroethyl ether containing at least three fluorine atoms attached to the ethyl group, of which at least one fluorine atom is attached to the alpha carbon atom.

15. 1,1,2,2-tetrafluoroethyl phenyl ether.

16. 1,1,2,2-tetrafluoroethyl beta-hydroxyethyl ether.

WILLIAM E. HANFORD.
GEORGE W. RIGBY.